US012133296B2

(12) United States Patent
Decker

(10) Patent No.: US 12,133,296 B2
(45) **Date of Patent: *Oct. 29, 2024**

(54) ELECTRONIC VAPORIZER HAVING TEMPERATURE SENSING AND LIMIT

(71) Applicant: EVOLV, LLC, Hudson, OH (US)

(72) Inventor: John Bellinger Decker, Wexford, PA (US)

(73) Assignee: EVOLV, LLC, Hudson, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/484,764

(22) Filed: Oct. 11, 2023

(65) Prior Publication Data

US 2024/0040667 A1 Feb. 1, 2024

Related U.S. Application Data

(63) Continuation of application No. 14/738,592, filed on Jun. 12, 2015, now Pat. No. 11,825,565.
(Continued)

(51) Int. Cl.
*H05B 1/02* (2006.01)
*A24F 40/51* (2020.01)
(Continued)

(52) U.S. Cl.
CPC ........... *H05B 1/0244* (2013.01); *A24F 40/51* (2020.01); *A24F 40/10* (2020.01); *A24F 40/60* (2020.01)

(58) Field of Classification Search
CPC ......... H01M 10/48; H01M 2002/0297; H01M 2010/4271; H01M 2/023; H01M 2/0257; H01M 2/0267; H01M 2/0277; H01M 2/0287; H01M 2/0482; H01M 2/06; H01M 2/1005; H01M 2/204; H01M 2/30
USPC ....... 219/504, 200, 201, 214, 221, 240, 260, 219/261, 264, 267, 268, 385, 386, 397, 219/402, 412, 413, 419, 425, 438, 441,
(Continued)

(56) References Cited

U.S. PATENT DOCUMENTS

| | | | |
|---|---|---|---|
| 4,922,901 | A | 5/1990 | Brooks et al. |
| 6,043,471 | A | 3/2000 | Wiseman et al. |

(Continued)

FOREIGN PATENT DOCUMENTS

| | | |
|---|---|---|
| DE | 202014101126 | 4/2014 |
| EP | 0430559 | 6/1991 |

(Continued)

OTHER PUBLICATIONS

International Search Report dated Mar. 7, 2016 in International Application No. PCT/US2015/035154.

(Continued)

*Primary Examiner* — Phuong T Nguyen
(74) *Attorney, Agent, or Firm* — Tucker Ellis LLP

(57) ABSTRACT

An electronic vaporizer including a heating element for heating a fluid to produce a vapor; a power source to provide electrical power to the heating element for heating the fluid; and a power control circuit configured to regulate a supply of electrical power from the power source to the heating element based at least in part on an operating temperature of the heating element and a temperature setting to prevent the operating temperature of the heating element from exceeding the temperature setting.

1 Claim, 11 Drawing Sheets

Related U.S. Application Data

(60) Provisional application No. 62/012,312, filed on Jun. 14, 2014.

(51) Int. Cl.
*A24F 40/10* (2020.01)
*A24F 40/60* (2020.01)

(58) Field of Classification Search
USPC ............... 219/482, 484, 485, 490, 494, 496; 392/408, 388, 390, 394, 398, 401, 404, 392/441, 444, 447, 497, 502
See application file for complete search history.

(56) References Cited

U.S. PATENT DOCUMENTS

| | | | | |
|---|---|---|---|---|
| 6,080,973 | A | 6/2000 | Thweatt, Jr. | |
| 6,393,233 | B1 | 5/2002 | Soulier | |
| 2002/0112723 | A1 | 8/2002 | Schuster et al. | |
| 2003/0132219 | A1 | 7/2003 | Cox et al. | |
| 2004/0149736 | A1 | 8/2004 | Clotheir | |
| 2005/0143866 | A1 | 6/2005 | McRae et al. | |
| 2006/0081616 | A1 | 4/2006 | Schuler | |
| 2007/0210068 | A1 | 9/2007 | Reusche et al. | |
| 2010/0006565 | A1 | 1/2010 | Ben-Shmuel et al. | |
| 2010/0163063 | A1 | 7/2010 | Fernando et al. | |
| 2010/0212679 | A1 | 8/2010 | Bishara | |
| 2011/0210105 | A1 | 9/2011 | Romashko et al. | |
| 2011/0265806 | A1* | 11/2011 | Alarcon | A24F 40/485 131/273 |
| 2012/0048266 | A1* | 3/2012 | Alelov | A24F 40/50 128/203.14 |
| 2012/0174914 | A1 | 7/2012 | Pirshafiey et al. | |
| 2013/0032159 | A1 | 2/2013 | Capuano | |
| 2013/0104916 | A1 | 5/2013 | Bellinger et al. | |
| 2014/0014126 | A1* | 1/2014 | Peleg | A24F 40/10 374/54 |
| 2014/0116525 | A1* | 5/2014 | Bondeson | B05C 11/1007 137/13 |
| 2014/0190496 | A1 | 7/2014 | Wensley et al. | |
| 2014/0332016 | A1 | 11/2014 | Bellinger et al. | |
| 2014/0338680 | A1 | 11/2014 | Abramov et al. | |

FOREIGN PATENT DOCUMENTS

| | | |
|---|---|---|
| EP | 2113178 | 11/2009 |
| EP | 2327318 | 6/2011 |
| WO | 2013098397 | 7/2013 |
| WO | 2014040988 | 3/2014 |
| WO | 2014187770 | 11/2014 |
| WO | 2015022448 | 2/2015 |

OTHER PUBLICATIONS

International Search Report dated Oct. 27, 2015 in International Application No. PCT/US2015/035671.

* cited by examiner

Constant Power Input

ELECTRONIC VAPORIZER HAVING TEMPERATURE SENSING AND LIMIT

CROSS-REFERENCE TO RELATED APPLICATIONS

This application is a continuation of U.S. application Ser. No. 14/738,592, filed Jun. 12, 2015, which claims the benefit of U.S. Provisional Application No. 62/012,312, filed Jun. 14, 2014, the entire content of which is incorporated herein by reference.

TECHNICAL FIELD

The present invention generally relates to electronic cigarettes and personal vaporizers. More particularly the present invention relates to control and construction of the heating element used in electronic cigarettes and personal vaporizers. More particularly the present invention relates to circuitry used to control the heating element used in electronic cigarettes and personal vaporizers.

BACKGROUND

A significant safety and performance concern with existing electronic cigarettes is the breakdown of flavorants and other fluid components due to excessive temperature. While existing control methods such as wattage control provide consistent vapor production while the heating element is provided with a steady supply of fluid, several conditions can exist that allow for elevated coil temperatures. One common condition is a power setting that is too high. The mass flow rate of vapor is primarily controlled by the heat output generated by the coil. However, if the fluid supply is insufficient, some of the power will superheat the vapor. To a certain degree this is desirable, to provide a hotter vapor to more accurately simulate smoking. However, there is concern that some of the constituents of the fluid will break down into harmful or bad tasting compounds if heated excessively.

Another more typical situation is when the fluid reservoir is nearly depleted, the flow rate necessarily falls towards zero. With existing control methods, the temperature of the coil will climb significantly. This makes the last bit of vapor produced unpleasant due to flavorant breakdown. If the power setting is high enough, the excessive temperature may melt the wicking material, destroying the atomizer. There is also concern that the breakdown products of the fluid and wicking material at these high temperatures may be hazardous.

A wattage controlled electronic cigarette as described in U.S. Patent Pub. 2013/0104916 will provide a constant vapor production despite changes in resistance of the coil. A wattage controlled electronic cigarette as described in U.S. Patent Pub. 2013/0104916 is also configured to read the electrical resistance of the heater coil in real time.

SUMMARY

One embodiment generally provides an electronic vaporizer including a heating element for heating a fluid to produce a vapor; a power source to provide electrical power to the heating element for heating the fluid; and a power control circuit configured to regulate a supply of electrical power from the power source to the heating element based at least in part on an operating temperature of the heating element and a temperature setting to prevent the operating temperature of the heating element from exceeding the temperature setting.

According to another embodiment, the electronic vaporizer includes a machine-readable indicia associated with the heating element configured to convey reference information to the power control circuit. Further, the machine-readable indicia may include at least one of a computer-readable storage medium, an RFID tag, or a printed code such as a bar code or QR code. Still further, the reference information specifies at least one of a resistance of the heating element at a predetermine temperature, a boiling point of the fluid, a temperature coefficient of resistance curve for the heating element, or the temperature setting.

In another embodiment, a method for controlling temperature of a heating element in an electronic vaporizer is provided. The method includes determining an operating temperature of the heating element based at least in part on a measured resistance of the heating element and calibration information established with respect to the heating element; comparing the operating temperature to a temperature setting; and regulating a power supplied to the heating element from a power source to maintain the operating temperature at or below the temperature setting. In a further example, the calibration information includes at least a reference resistance indicating a resistance of the heating element at a predetermined temperature and a temperature coefficient of resistance curve for the heating element. In another example, the temperature setting is a preheat temperature such that the method further includes detecting user inhalation based on an amount of power required to maintain the operating temperature at the preheat temperature; and regulating the power supplied to the heating element from the power source to prevent the operating temperature from exceeding a second temperature setting during user inhalation; and reducing the power supplied to the heating element after user inhalation to return the operating temperature to the preheat temperature. In still a further example, regulating the power supplied to the heating element includes supplying additional power until the operating temperature reaches the temperature setting.

This and other embodiments are described in more detail below.

DESCRIPTION

BRIEF DESCRIPTION OF THE DRAWING

Various non-limiting embodiments are further described with reference the accompanying drawings in which.

DETAILED DESCRIPTION

Figure 1:
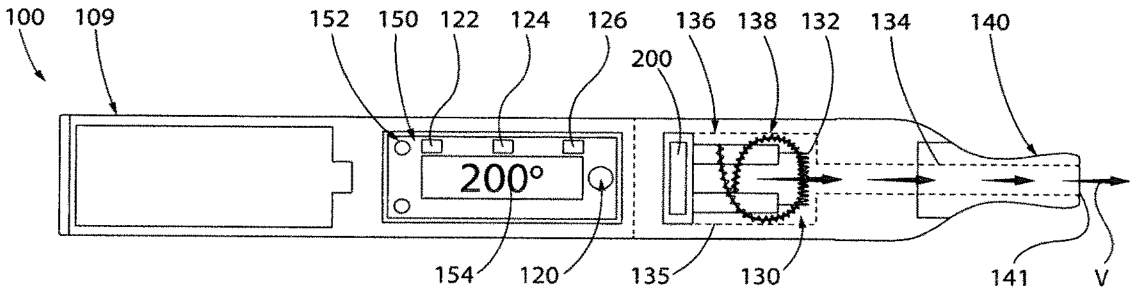
FIG. 1 is somewhat schematic view of an exemplary, a non-limiting embodiment of an electronic vaporizer according to one or more aspects.

With reference to the drawings, the above noted features and embodiments are described in greater detail. Like reference numerals are used to refer to like elements throughout.

As used herein, an "electronic vaporizer" is a personal vaporizer or electronic cigarette and includes any device that includes a powered heating element that heats a fluid to produce vapor that is inhaled by the user. Such devices may be referred to as personal vaporizers, vaping devices, electronic smoking devices, electronic cigarettes, pipes, or cigars. A "heating element" as used herein refers to any element, assembly or device that applies heat to the liquid to be vaporized and may have any shape or configuration. References to a heating coil or wire are included herein as one non-limiting example of a heating element. According to one embodiment, the heating element temperature is controlled to a safe level under all fluid and air flow conditions.

Turning to FIG. 1, illustrated is a partially schematic diagram of an exemplary, non-limiting embodiment of an electronic vaporizer 100. As shown, the electronic vaporizer 100 can include a power source 110, such as a battery, a controller 120, an atomizer 130, and a vapor outlet 141 which may be part of a mouthpiece 140. These components may be provided within a housing, generally indicated at 109. Housing 109 may be a single component or be comprised of multiple sub-housings that are connected together. For example, the power source 110 and controller 120 may be housed in a first housing, the atomizer in a second housing, and the vapor outlet 140 in a third housing, where the second housing attaches to the first housing and the third housing attaches to the second housing. For example, atomizers 130 typically are replaced once the liquid contained therein is depleted or to use a different atomizer or liquid source. Likewise, the mouthpiece or tip that defines the vapor outlet may be interchanged as desired. To that end, connection of the mouthpiece 140 to atomizer 130 creates a fluid connection between the atomizer 130 and vapor outlet 141 to allow vapor V produced by atomizer 130 to exit housing 109 at vapor outlet 141 for inhalation by the user.

The atomizer 130 can include a heating element 132 generally positioned within an air channel 134 leading to the mouthpiece 140. Further, at least one heating element 132 can be in fluid communication with a fluid 138 held in a chamber, tank or other container 136. As discussed in greater detail below, a wicking material 135 or other delivery mechanism can be employed to convey fluid 138 from the container 136 to a location proximate to the heating element 132. Fluid 138, which is deposited near or in contact with the heating element 132, boils and transitions to a vapor when the heating element 132 is heated via electrical power provided by power source 110 and regulated by controller 120. The vapor, once generated, can be drawn up the air channel 134 by an air flow created by a user via the mouthpiece 140. While referred to herein as a vapor, it is to be appreciated that, in some embodiments, the output of the electronic vaporizer 100 is an aerosol mist form of fluid 138.

One parameter or characteristic on which user experience with the electronic vaporizer 100 is based includes an amount or quantity of vapor generated. This parameter generally corresponds to a power input (e.g., wattage) to the heating element 132. The controller 120 can ensure a substantially consistent and uniform vapor production and, therefore, consistent user experience, by regulating the power input from power source 110 to the heating element 132 to maintain a preset level. Another parameter or characteristic influencing the user experience is a quality of the vapor (e.g., taste, feeling, etc.). This parameter generally correlates to a temperature of the heating element 132. Fluid 138 can be a mixture of propylene glycol, glycerin, water, nicotine, and flavorings. At a high temperature, these compounds can degrade into less flavorful materials, or potentially harmful substances. Accordingly, the controller 120 can determine the temperature of the heating element 132 and control the power source 110 to prevent the temperature of the heating element 132 from exceeding a set temperature. As with the preset power level described above, the set temperature is configurable by the user.

In one example, temperature control can be implemented by utilizing a heating element comprising a material with a known, positive temperature coefficient of resistance. The controller 120, by measuring a relative change in resistance of the heating element 132, can determine a relative change in temperature. By establishing a reference resistance, e.g., an absolute resistance of the heating element at a known temperature, the controller 120 can determine an average temperature of the heating element 132 based on a measured resistance.

According to an embodiment, controller 120 includes a processor 122 and memory 124. According to one embodiment, memory 124 may be an EEPROM. Controller 120 monitors operation of the heating element 132 to ensure that heating element temperature and/or vapor temperature is at a safe level such as at or below a pre-selected limit or within a pre-selected range. For simplicity the pre-selected limit or range will be referred to herein as a safe level. It will be understood that a safe level may be one that prevents the breakdown of components of the fluid or chemical conversion into potentially harmful or foul-tasting compounds. The safe level may be preset within the controller 120. Alternatively, since the safe level may depend on a user's tastes or other subjective criteria, the safe level may be pre-set or adjusted through user input. To that end, electronic vaporizer 100 may optionally include a user interface, generally indicated by the number 150.

User interface 150 may be mounted on housing 109 or be located remotely thereof and connected by wired or wireless connections to convey inputs from the user to controller 120. User interface 150 may include a user input 152, which is any device that allows a user to input information or commands to controller 120 and may include but is not limited to buttons, switches, dials, a touchpad or the like. The interface 150 may optionally include an output or display 154 that conveys information to the user including but not limited to the temperature limit value and or the present temperature of heating element and/or fluid. The display 154 may be any device suitable for providing information to the user including but not limited to a graphical or visual display, an audible or tactile output device or a combination thereof. In the example shown, display 154 includes an LED screen that provides visual information to the user.

Figure 8:
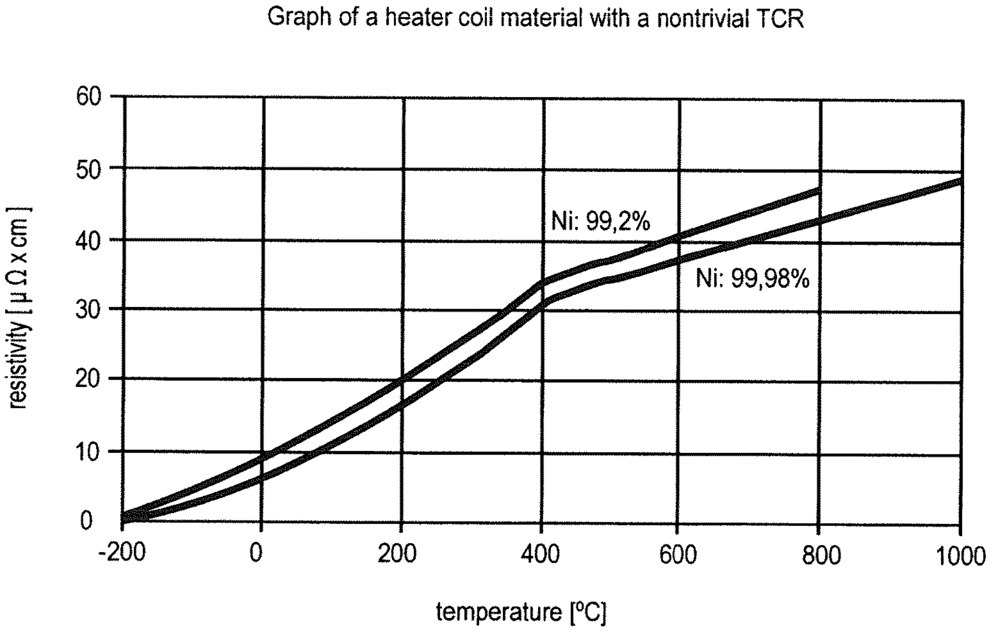
FIG. 8 is a graph of resistance over temperature for heater coil materials with a nontrivial resistance.

In the example shown, heating element 132 includes a heating coil 133 constructed of a heating wire with a non-trivial i.e. a positive temperature coefficient of resistance (TCR). Such a heating coil will change electrical resistance in proportion to its temperature as shown in FIG. 8. If the coefficient of resistance is known, and the resistance of the heater coil at a specific reference temperature is known, then from change in resistance of the coil the temperature can be calculated in real time. Pure nickel has particularly favorable properties for construction of a temperature-sensing heating coil. It has a very high working temperature, a high temperature coefficient of resistance, low vapor pressure, low corrosion and low toxicity. Among other materials that might reasonably be used are stainless steel and tungsten. Conceptually any heating coil material with a known TCR may be employed, but in practice a high TCR is preferred for sensitivity and accuracy.

Figure 2:
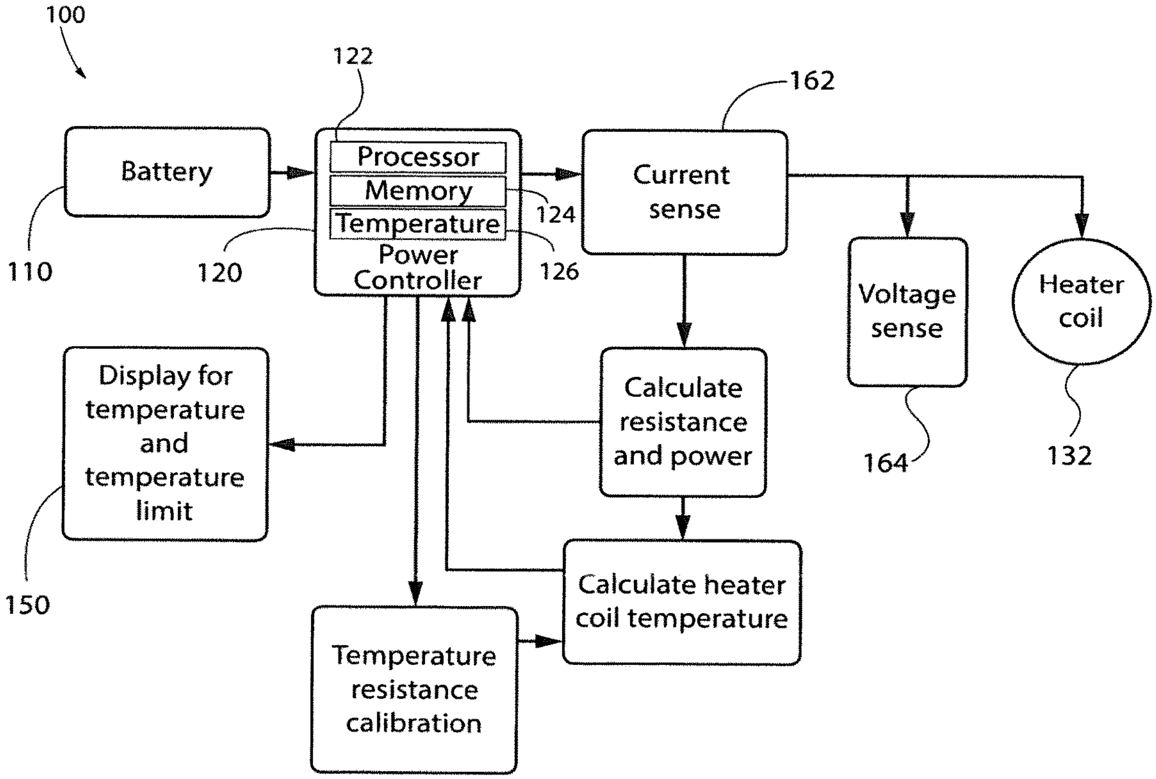
FIG. 2 is a schematic diagram of an exemplary, non-limiting temperature control circuit for an electronic vaporizer according to one or more aspects.

With reference to FIG. 2, a general circuit diagram for the controller 120 is shown. The controller 120 measures the ambient temperature, provides a variable level of power to the heating coil, reads the heating coil's resistance, calculates the temperature, and provides control and temperature limiting functions. It may optionally take user input and display temperature limit or present temperature, as discussed above. As shown, power controller 120 is connected to power source 110, and includes a power control circuit for regulating power to heater element 130. Power control circuit 145 may include a current sense 162 and voltage sense 164 that are used to calculate resistance and power and provide resistance and or power feedback to controller 120. This feedback may also be used to calculate the temperature of heating element 132, referred to as coil temperature in the depicted example, based on temperature resistance calibration information generated by controller 120 as discussed more completely below.

Coil temperature can be used to control the fluid temperature since the fluid temperature will not exceed the coil temperature. Alternatively, a temperature sensor that monitors fluid temperature could be used to provide temperature feedback to controller to shut down or regulate the temperature. In the embodiment, shown, coil temperature is used. Once the coil temperature has been calculated, it can be compared to a programmed or user-adjustable temperature safe level. If the sensed temperature of the coil is near or above the temperature limit, the power control circuit 145 can detect this as an error condition and shut off power delivery to the heating element 132. Alternatively, the controller 120 of the power supply circuit can be configured to control the coil temperature to be at or below the programmed maximum as shown in FIG. 3.

Figure 3:
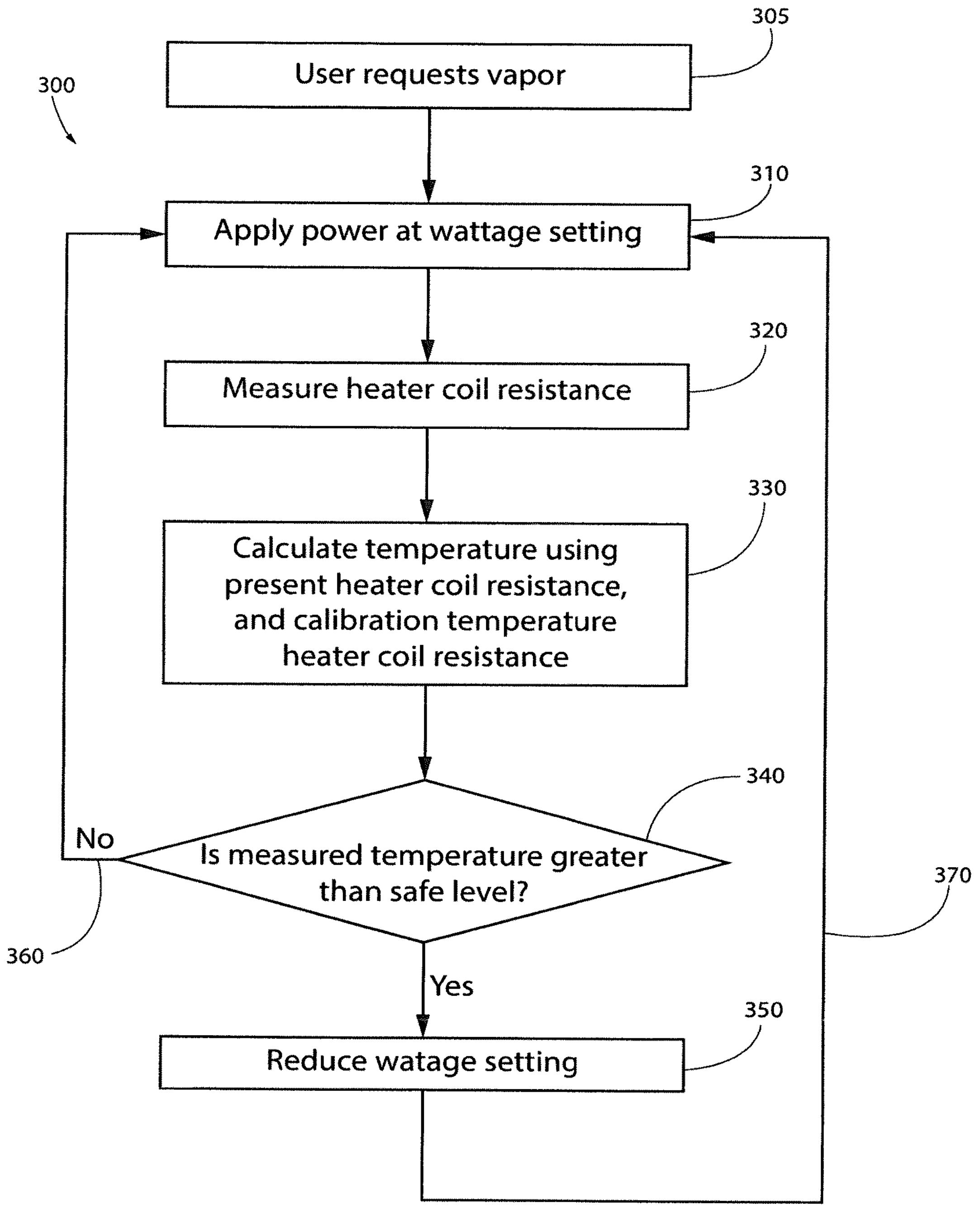
FIG. 3 is a flow chart of an exemplary, non-limiting temperature control method according to one or more aspects.

With reference to FIG. 3, controller 120 may upon detecting a user's request for vapor. The request for vapor 305 may be sensed through airflow through the air channel 134, an accelerometer in the housing 109 or through a user input such as an activation button 155 (FIG. 1). Upon the user requesting vapor 305, controller 120 may be programmed to apply power to heater element 130 at a wattage setting 310, measure the heater element resistance 320, calculate temperature 330 using the heater coil resistance and calibration temperature heater coil resistance. If the measured temperature resistance is greater than the safe level 340, then the wattage setting is reduced 350 to reduce the coil temperature. Following this reduction, the controller 120 loops back at 370 to apply power at the wattage setting and repeats the monitoring process. If the controller 120 does not find the measure temperature greater than the safe level at 340, the controller 120 loops back at 360 to continue to apply power at the wattage setting.

Figure 10:
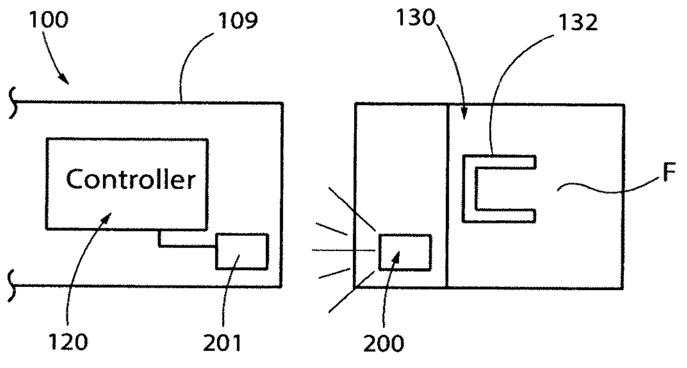
FIG. 10 is a partially schematic cross-sectional view of an exemplary, non-limiting electronic vaporizer including a removable atomizer that includes a radio frequency identifier that communicates at least a maximum temperature to the power controller.
Figure 11:
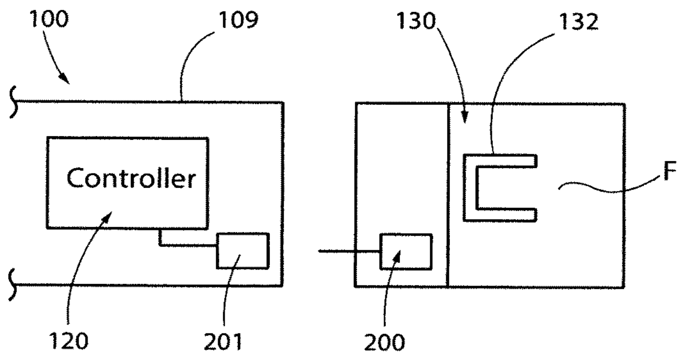
FIG. 11 is a partially schematic cross-sectional view of an exemplary, non-limiting electronic vaporizer including a removable atomizer that includes a EEPROM identifier that communicates at least a maximum temperature to the power controller.
Figure 12:
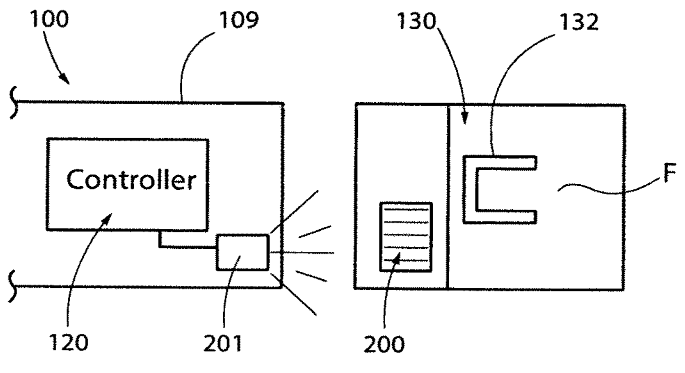
FIG. 12 is a partially schematic cross-sectional view of an exemplary, non-limiting electronic vaporizer including a removable atomizer that includes a visual identifier that communicates at least a maximum temperature to the power controller.

The fluid F is heated only by the one or more heating elements 132 such that the fluid temperature will not be greater than the heating element temperature when the heating element is active. The safe level used to control the temperature of the heating element may be set below the breakdown temperature of the components of the fluid to prevent the fluid from being converted chemically into potentially harmful or foul-tasting components. As indicated above, the safe level may be preset within controller 120, selected by the user, or a preset value in controller 120 may be adjusted by the user through an input. According to another embodiment, controller 120 may set the safe level based on input from another component, such as the atomizer 130. Since the fluid within atomizer may vary or the resistance of the heating element in atomizer may vary, the atomizer may be provided with an machine-readable indicia or identifier, generally indicated by the number 200, configured to convey reference information to the power control circuit 145 or controller 120. In one example, identifier 200 conveys at least the appropriate safe level temperature setting based on its contents. Identifier 200 may include a radio frequency identification chip (FIG. 10), computer readable storage medium such as for example, an EEPROM (FIG. 11), bar code, QR code or other visual code (FIG. 12), or similar device that communicates at least maximum permissible temperature i.e. maximum safe level to controller 120. In the example shown, a replaceable atomizer 130 is attached to a housing 109 that encompasses the controller 120. The controller 120 may include a reader 201 that receives a signal, or scans a visual code depending on the identifier configuration. As shown in FIG. 10, reader 201 receives a radio frequency signal from identifier 200. In FIG. 11, reader 201 receives an electronic signal upon connection of the computer readable storage medium identifier 200. In FIG. 12, reader 201 scans the visual identifier 200. It will be understood that reader 201 may be a separate component that communicates with controller 120 or be formed as part of controller 120. According to an embodiment, the identifier 200 communicates at least the maximum safe temperature based on the contents of the atomizer i.e. the liquid, the heating element type etc. This maximum safe level creates an upper limit, such that, if the vaporizer 100 includes a user input 150, any adjustment by the user would be subject to this upper limit for safety purposes. In other words, the user might input a lower temperature limit based on individual taste but could not exceed the maximum safe value. It will be understood that the identifier 200 may communicate additional information to controller 120.

Because the resistance of the heating element is not precisely fixed due to varying models, manufacturing tolerances, degradation or windings shorting against each other, according to an embodiment, controller 120 determines a coil resistance using a known reference temperature. Four examples are provided below but are not limiting.

Controller 120 implements temperature control. With reference to FIG. 2, controller 120 provides current to heating element 132. A current sense 162 and a voltage sense 164 are provided to detect the current and voltage output to calculate the resistance and power at 166. According to a first example, controller 120 calculates the temperature of heating element 132 based on a deviation of the resistance of the heating element at a specific temperature. A temperature is specified by the manufacturer or by the user within controller 120. For example, a manufacturer may determine the resistance of heating element 132 to be 1 ohm at room temperature, 23 degrees Celsius. With reference to FIG. 8, a heating element constructed of 99.2% pure nickel is provided. Controller 120 is set to a power level of 8 watts. Using wattage control methods including for example those disclosed in U.S. Patent Pub. 2013/0104916 incorporated herein by reference, the controller 120 delivers 4 volts and 2 amps, calculating the resistance to be 2 ohms. The calculated resistance is 2.0 times larger than the reference resistance. As shown in FIG. 8, resistivity is directly proportional to resistance for the same heating element. The initial resistivity was 10 microohm*cm, so the present resistivity is 2 ohm/1 ohm multiplied by the resistivity or 20 microohm*cm. As shown in FIG. 8, the coil temperature is 200 degrees C.

Figure 4:
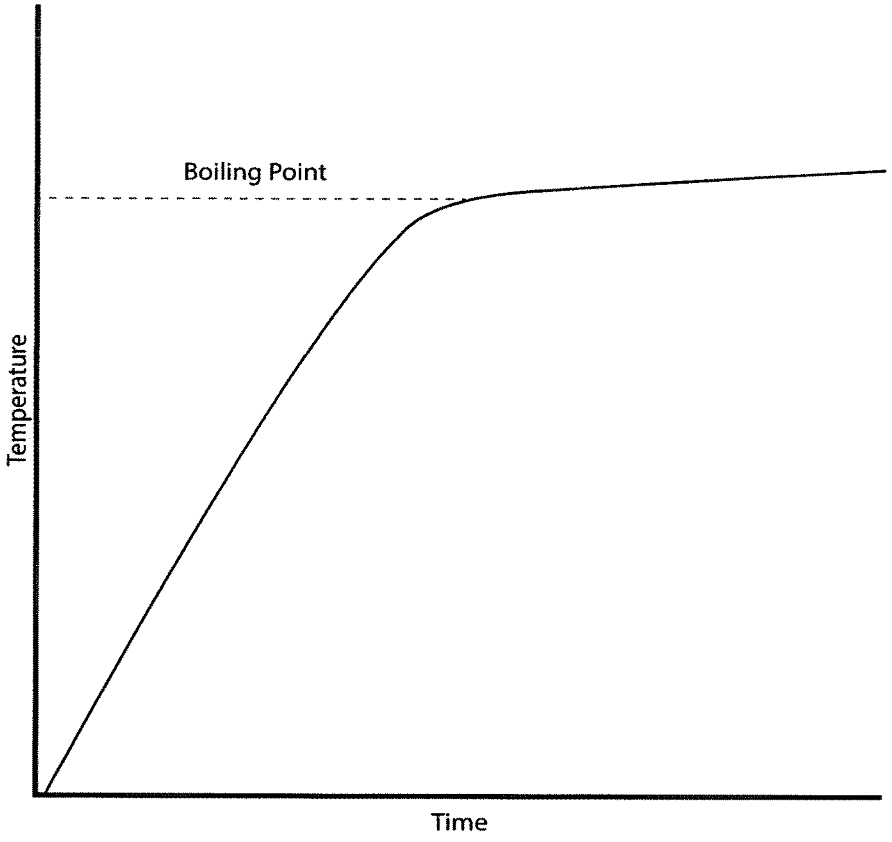
FIG. 4 is diagram plotting temperature over time to identify a boiling point at a constant power input.

According to a second embodiment, the composition of the fluid is known providing a known boiling point temperature for a given atmospheric condition. Optionally, controller may include an altimeter or barometer to adjust the boiling point based on sensed atmospheric conditions that deviating from the manufacturers specification for the fluid. With a constant wattage generated at the heating element 132, fluid in proximity thereto will begin to rise at a rate proportional to the applied wattage and the specific heat of the fluid. Once the boiling point is reached, the generated heat will go into boiling some proportion of the fluid into vapor rather than raising the temperature of the liquid. By measuring or recording the rate of change of temperature of heating element 132, a change in the slope can be identified as depicted in FIG. 4. This change in temperature response corresponds to the boiling point. Because the known boiling point is necessarily less than the safe level, this permits temperature measurement at all subsequent times. If a change in slope is not detected, heating element 132 is starved for fluid and a previous calibration should be used, or, if there is no previous calibration, controller 120 should stop providing power to heating element 132.

Figure 5:
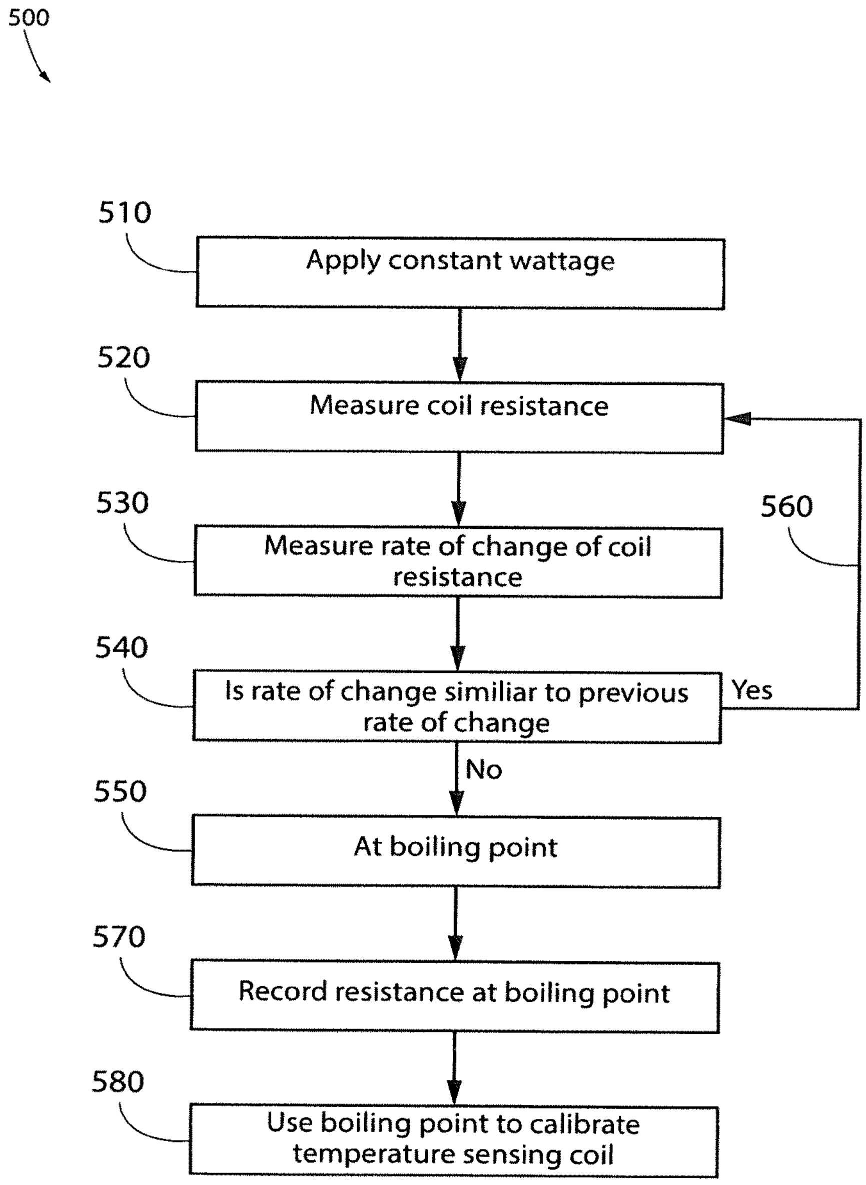
FIG. 5 is a flow chart of an exemplary, non-limiting method of calibrating the temperature control circuit in an electronic vaporizer using a boiling point.

With reference to FIG. 5, controller 120 applies a constant wattage 510, measures the coil resistance 520 and measures the rate of change of coil resistance 530. If the rate of change is similar to a previous rate of change, controller continues to measure the coil resistance and rate of change at 560. If the rate of change is not similar to a previous rate of change i.e. a deviation in the slope of change as discussed above, controller 120 determines if the fluid is at its known boiling point 550 and records the heating element resistance at boiling point 570. Controller than uses the boiling point to calibrate temperature sensing 580 at heating element 132.

For example, an atomizer 130 contains a 100% propylene glycol fluid. The heating element material is 99.2% nickel. The boiling point of propylene glycol is known to be 188.2 degrees C. Applying a constant 12 watts of heat to heating element, a decrease in the rate of rise of temperature is detected when voltage is 6.0 volts and current is 2.0 amps. The resistance is, therefore, calculated as 3.0 ohms providing a temperature-resistance pair (188.2 C and 3.0 ohms) that is stored in controller's memory 124. At a later time, the fluid has boiled away and temperature increases with 6.93 volts and current at 1.73 amps, providing a resistance of 4.0 ohms. Temperature may be calculated based on resistivity of the heating element at 3 ohms and 188.2 degrees (calibration temperature-resistance pair) is 19 microohm*cm for the heating element material (FIG. 8). This value is stored in memory 124 of controller 120. The new resistivity is equal to the reference resistivity multiplied by the new detected resistance divided by the reference resistance. In the present example, 19 microohm*cm times 4 ohm/3 ohm equals microohm*cm. Referencing FIG. 8, the heating element temperature is 270 C.

Figure 6:
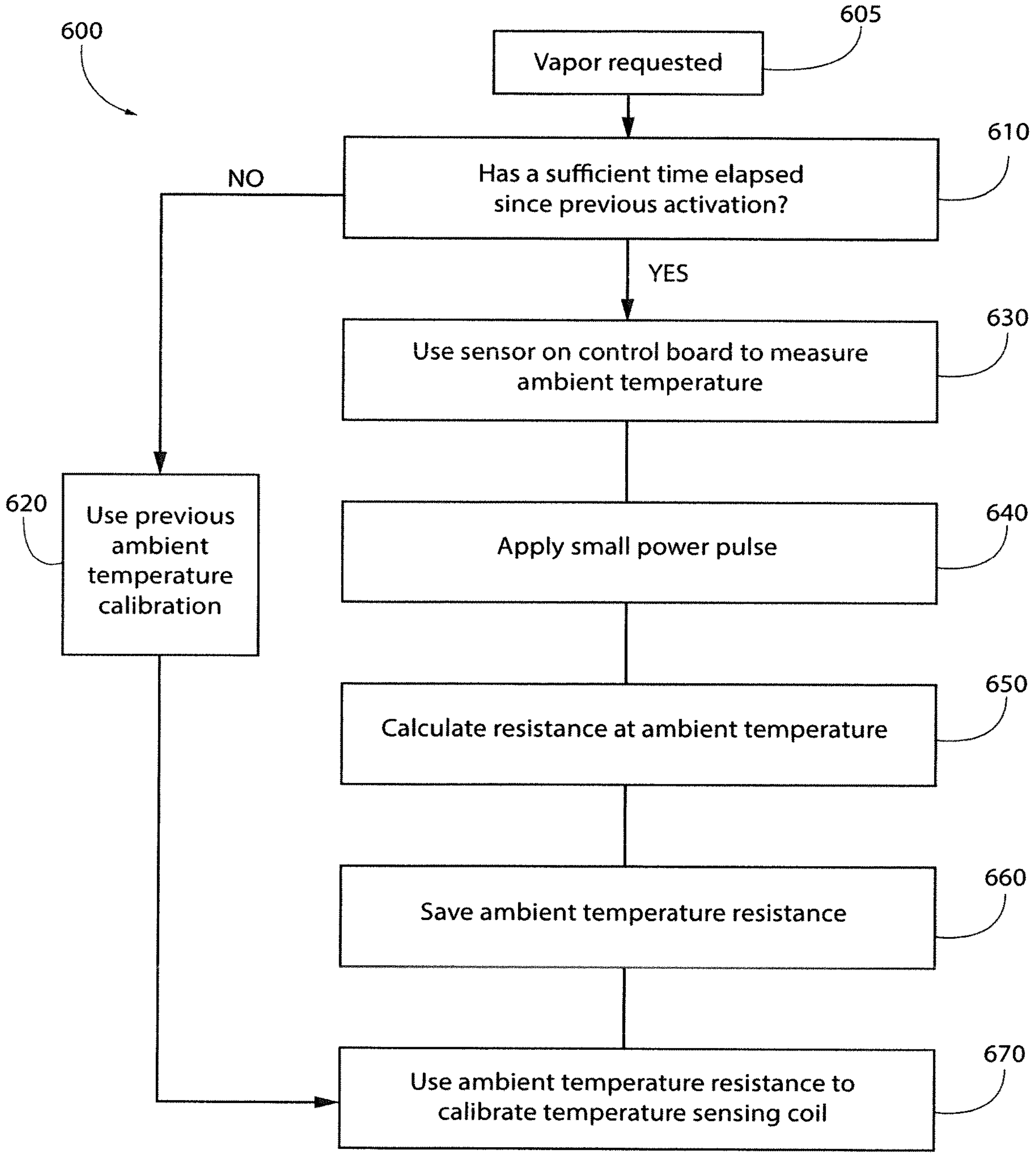
FIG. 6 is a flow chart of an alternative exemplary, non-limiting method of calibrating the temperature control circuit in an electronic vaporizer using ambient temperature.

With reference to FIG. 6, a third example of calculating the temperature of heating element 132 is provided. According to this example, controller 120 applies a small power, voltage or current to heating element 132 for a brief duration to measure the resistance of heating element 132. In this example heating element is assumed to be cooled to ambient temperature based on the typical use of the electronic vaporizer 100. In particular, users typically take one or more breaths of vapor and do not activate the device for a period of time. Electronic vaporizer 100 containing a sensor for ambient temperature can reasonably recognize that the heating element is at room temperature after a sufficient time period. Controller 120 may include a timer to determine the length of time since the last heating element activation period to determine whether sufficient time has passed to allow the heating element to return to room temperature. If a longer period since the last full-power activation has elapsed, a small, short-duration pulse is generated by controller 120 with the assumption that the heating element 132 is at room temperature for purposes of calculation. A short pulse is used so that the pulse itself does not generate sufficient heat to raise the heating element temperature above measured room temperature. Optionally, controller 120 may take several successive measurements, the temperature rise generated by each measurement pulse can be calculated and subtracted from the measured temperature to calculate the temperature at the heating element before any power was applied.

With further reference to FIG. 6, controller 120 implements the following process 600. In particular, upon detecting a vapor request at 605, controller determines if sufficient time has passed since the last power activation 610. If sufficient time has not passed, controller 120 uses a previous ambient temperature calibration 620 and uses the temperature resistance from that previous calibration to calibrate the temperature sensing 670 for heating element 132. If sufficient time has passed ambient temperature calibration proceeds as follows. Controller 120 uses a temperature sensor 126 (FIG. 1) to measure ambient temperature 630. Any temperature sensor may be used including but not limited to a thermistor, thermocouple and the like. Controller 120 applies a small power pulse at 640. Controller 120 calculates resistance at ambient temperature at 650 and saves the ambient temperature resistance to memory 124 at 660.

Controller uses the ambient temperature resistance from memory 124 to calibrate temperature sensing 670 at heating element 132.

For example, controller 120 may sense ambient temperature of 30 degrees C., and determine that several hours have passed since the heating element 132 was last activated. A power pulse of one watt is applied for 100 milliseconds and at the end of this period the coil resistance is calculated to be 1.02 ohms. Immediately afterwards, a second power pulse of one watt is applied for 100 milliseconds. A the end of this period the heating element resistance is calculated to be 1.04 ohms. Linearly extrapolating from these measurements, an applied power of 1 watt causes a resistance rise of 0.02 ohms per 100 milliseconds. Subtracting this rate from the resistance measured after the first 100 millisecond heating pulse, the resistance before any power was applied is calculated to be 1.00 ohms. Given the long period of inactivity, thermal gradients within the heating element are negligible. Therefore, the resistance at the ambient temperature of 30 degrees C. is 1.00 ohms. This temperature-resistance pair is stored in memory 124 and used to calculate heating element temperature from subsequent heating element resistance readings.

Figure 7:
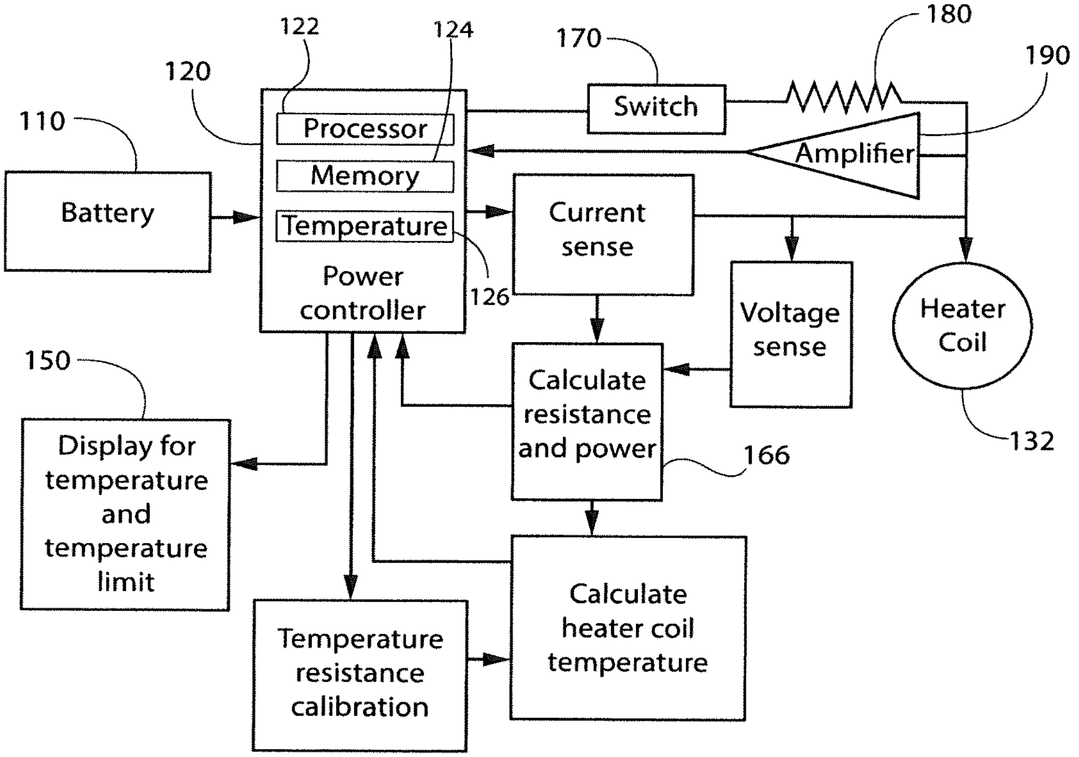
FIG. 7 is a schematic diagram of an exemplary, non-limiting negligible self-heating temperature control circuit and method according to one or more aspects.

According to a fourth example, controller calculates heating element resistance at a known temperature, but uses a fixed resistor divider, current source, voltage source or power source together with a sensitive amplifier to calculate heating element resistance. This configuration applies a low enough power setting to cause only a negligible rise in heating element temperature resulting from the measurement. With reference to FIG. 7, an electronic vaporizer 100 includes a power source 110 electrically connected to a controller 120. Controller 120 further is electrically connected to a current sense 162 and voltage sense 164 and a heating element 132. Power from controller 120 is applied to heating element 132 as described above. In particular, a switch 170, fixed resistance divider 180 and amplifier 190 are provided within the circuit between controller 120 and heating element 132. Calculation of the heating element resistance occurs according to a method similar to the third example using the switch to selectively apply a current, voltage or power using the fixed resistor divider 180 and amplifier 190 to calculate the heating element resistance with low power.

According to another embodiment, electronic vaporizer 100 may include a controller 120 that rapidly pre-heats the heating element to the safe value or other pre-selected operating temperature. Since no vapor is produced until the fluid reaches its boiling point, raising the heating element temperature to a boiling point as fast as possible reduces delay between the user request for vapor and vapor production. If the user inhales before the boiling point is reached, minimal or no vapor will be received. Using the second calibration example, i.e. when the boiling point of the fluid is known, the boiling point of the fluid or the coil resistance at the boiling point can be recorded in memory 126 at the first activation. When the user requests vapor, controller 120 supplies maximum power to heating element 132 until the coil resistance reaches the stored boiling point resistance or the sensed temperature reaches the stored boiling point temperature. When this temperature/resistance is achieved, controller 120 switches to a standard control method such as wattage or voltage control.

Figure 9:
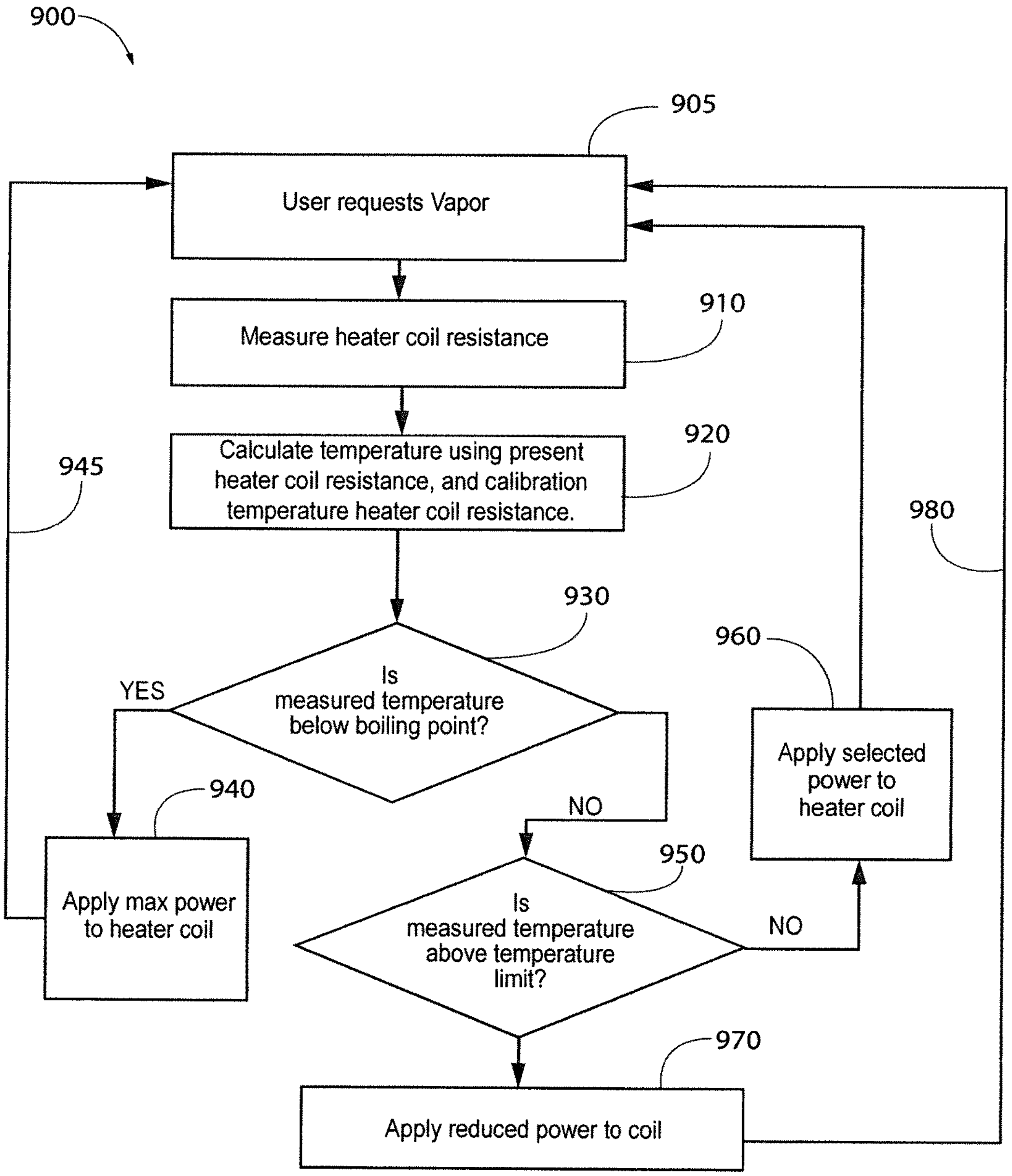
FIG. 9 is flow diagram of an exemplary, non-limiting method of rapidly pre-heating a heating element in an electronic vaporizer according to one or more aspects.

With reference to FIG. 9, controller 120 in an electronic vaporizer 100 detects a user request for vapor at 905 and measures heating element resistance at 910. The controller 120 calculates temperature using the present heater coil resistance and calibration temperature heater coil resistance at 920. The measurement and calculation may be performed as described in the earlier example. Controller determines whether a measured temperature is below the boiling point at 930. If the measured temperature is below the boiling point, maximum power is applied 940 by the controller 120 to heating element 132. Resistance measurement and temperature calculation continues at 945 until the boiling point is reached.

If controller 120 determines at 930 that the measured temperature is not below the boiling point, controller checks if the temperature is above the safe level at 950. If it is, reduced power is applied at 970 and the resistance/temperature calculation continues until the safe level is reached at 980. If the measured temperature is not above the safe level, a selected power is applied at 960 to the heating element 132. Afterwards, the measurement and calculation continue as vapor is requested by the user.

Figure 13:
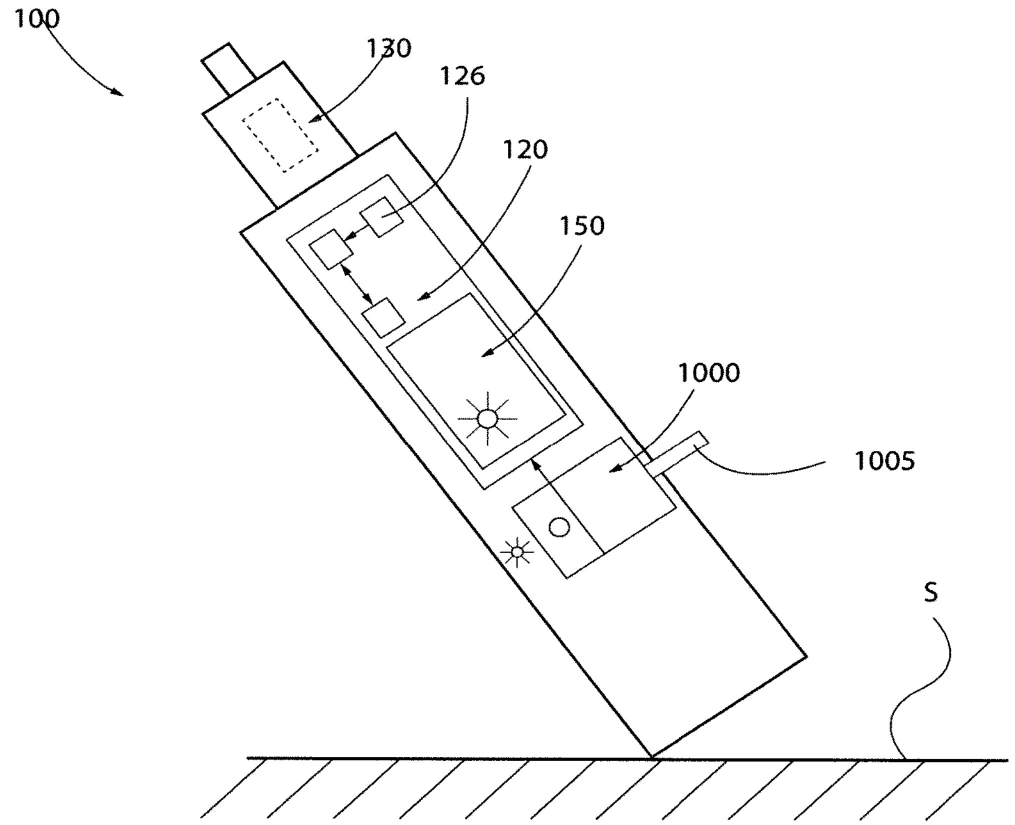
FIG. 13 is a partially schematic cross-sectional view of an exemplary, non-limiting electronic vaporizer including an activator that signals the controller to enter an active mode.
Figure 14:
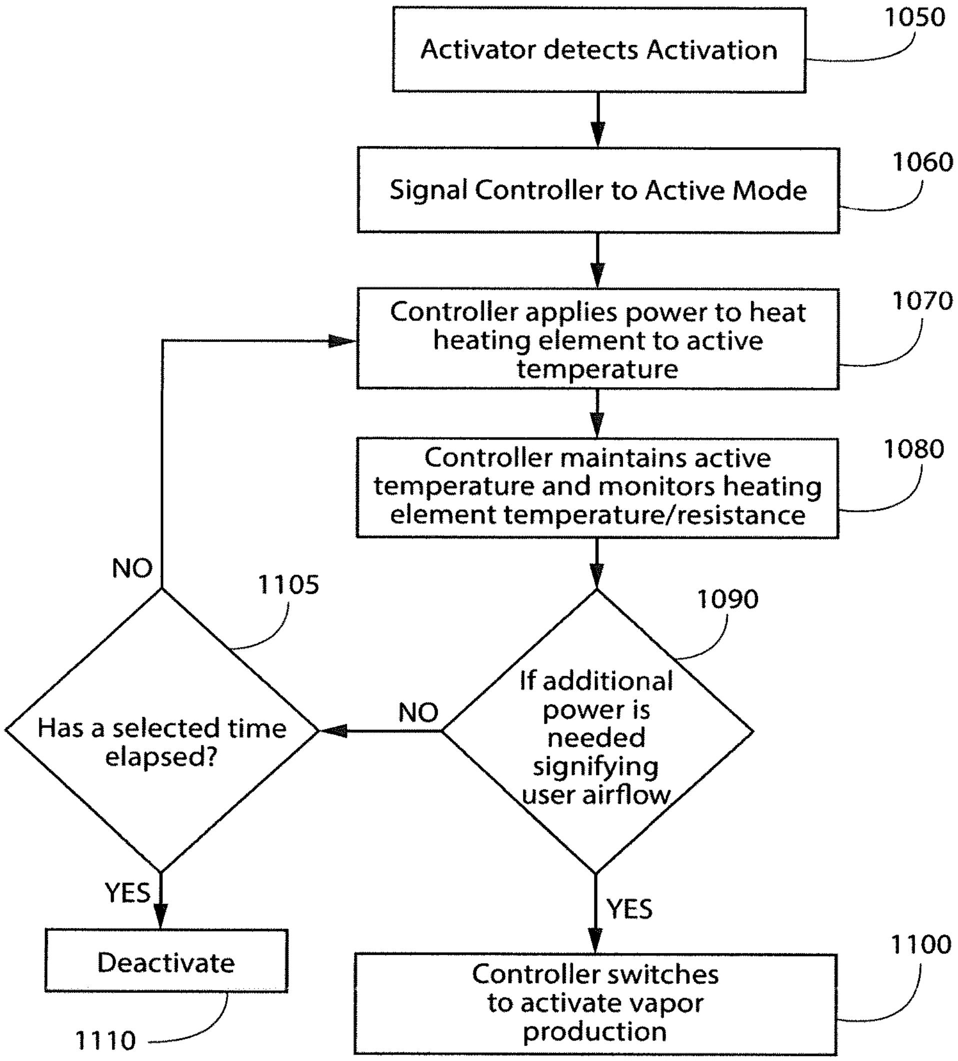
FIG. 14 is a flow chart of an exemplary, non-limiting method of entering an active mode to provide power to the heating element to generate an active temperature.

With reference to FIGS. 13 and 14, according to another embodiment, electronic vaporizer 100 may include an activator 1000 that work in conjunction with the heater temperature sensing described in the various embodiments above to create a more realistic smoking simulation. Activator 1000 puts controller 120 into an active mode. Activator 1000 may be a button 1005 that the user presses or may include an accelerometer 1006 that signals the controller 120 upon a selected movement of the electronic vaporizer, such as for example, tapping the tip of the vaporizer 100 against a surface S. An active indicator 1010 such as a visual (light, icon on display, color change on display 150), audible (various sounds), or tactile (vibration, temperature change) cue may be provided to indicate that the vaporizer 100 is in an active mode.

In use, activator 1000 detects activation 1050 from a user input. Upon detection of activation, activator 1000 signals controller 120 to enter an active mode 1060. In active mode, controller 120 provides power to a temperature limit below boiling point referred to as an active temperature 1070. Any temperature greater than ambient and less than the boiling point could be used as the active temperature. The active temperature may be pre-set by the manufacturer and stored in memory 124 of controller 120 or active temperature may be defined by the user through an input to controller 120. In the example considered, a temperature of 65 C was generated. The corollary being when a cigarette is lit but no air is being drawn through it. In the electronic vaporizer 100, the lack of air draw allows the power provided by controller 120 to maintain the active mode temperature to be nearly constant once the temperature is reached. Controller maintains the active temperature and monitors the temperature or resistance of heating element at 1080.

If air is drawn through electronic vaporizer 100, additional power will be required to maintain the temperature. Controller 120 detects at 1090 the demand for additional power to switch to active vapor production at 1100. As long as the user draws air across the heating element 132, vapor will be produced and the temperature of heating element 132 will remain fairly steady. When the user stops drawing air, the temperature of the heating element will rise at constant wattage. The controller 120 detects the second rise in temperature and returns to a low temperature limit state to await the next user inhalation. If the user has not inhaled for a selected period of time, as determined at 1105, controller turns power to heating element 132 off 1110.

In one embodiment, a device is described herein. The device includes an electronic vaporizer including a heating element for heating a fluid to produce a vapor; a power source to provide electrical power to the heating element for heating the fluid; and a power control circuit configured to regulate a supply of electrical power from the power source to the heating element based at least in part on an operating temperature of the heating element and a temperature setting to prevent the operating temperature of the heating element from exceeding the temperature setting.

According to one example, the device includes a power circuit configured to determine the operating temperature of the heating element; compare the operating temperature to the temperature setting; and reduce the electrical power output to the heating element when the operating temperature exceeds the temperature setting.

According to another example, the power circuit is further configured determine the operating temperature of the heating element based on a measured resistance and a reference resistance based on known temperature coefficient of resistance characteristics associated with the heating element, the reference resistance indicates a resistance of the heating element at a predetermined temperature. Further the power control circuit may include a current sense to measure a current output to the heating element and a voltage sense to measure a voltage output to the heating element, and the power control circuit is further configured to determine a resistance of the heating element based on the current output and the voltage output, and determine the operating temperature based on the resistance. In another example the power control circuit is configured to determine the reference resistance based on a predetermined boiling point of the fluid. Further, the power control circuit may be configured to measure the resistance of heating element, detect a leveling of a rate of change of the resistance, and associate a resistance of the heating element at which the leveling occurs with the boiling point to establish the reference resistance.

In another example, the electronic vaporizer further includes a temperature sensor operably coupled with the power control circuit, wherein the power control circuit is configured to determine the reference resistance based on an ambient temperature measured by the temperature sensor. Further, the power control circuit may be configured to apply a pulse of electrical power to the heating element; measure the resistance of the heating element when the pulse is applied; and associate the resistance measured during the pulse to the ambient temperature to establish the reference resistance. Still further, the power control circuit may be configured to apply two or more pulses to the heating element, measure the resistance of the heating element during each pulse, determine a change in resistance of the heating element as a result of each pulse, and extrapolate a resistance of the heating element prior to application of the pulses based at least in part on the change in resistance According to another embodiment, the electronic vaporizer includes a machine-readable indicia associated with the heating element configured to convey reference information to the power control circuit. Further, the machine-readable indicia may include at least one of a computer-readable storage medium, an RFID tag, or a printed code such as a bar code or QR code. Still further, the reference information specifies at least one of a resistance of the heating element at a predetermine temperature, a boiling point of the fluid, a temperature coefficient of resistance curve for the heating element, or the temperature setting.

According to another example, the electronic vaporizer further includes a user interface including a display to output at least one of the temperature setting or the operating temperature, and means for inputting the temperature setting.

According to still another example, the power circuit may be configured to supply a maximum power to the heating element until the operating temperature reaches a set point, and to subsequently regulate the supply of power in accordance with at least one of a power setting or the temperature setting.

According to still another example, the power circuit may be configured to regulate the supply of power to the heating element to maintain the operating temperature of the heating element at a set point, and to increase the supply of power to the heating element to trigger vapor production in response during user inhalation. Further, the power control circuit may be configured to monitor an amount of power supplied to the heating element to maintain the operating temperature at the set point, to detect a change in the amount of power signaling user inhalation, to regulate the supply of power to the heating element in accordance with the temperature setting during user inhalation.

According to another example, the device includes a power control circuit for an electronic vaporizer having a power source and a heating element, including a current sense configured to measure a current provided to the heating element; a voltage sense configured to measure a voltage applied to the heating element; and a processor-based controller configured to determine an operating temperature of the heating element based at least in part on the current and voltage, and to regulate a supply of electrical power from the power source to prevent the operating temperature of the heating element from exceeding a temperature setting. Further, the processor-based controller may include a processor and a computer-readable storage medium having stored thereon executable instructions that, when executed, configure the processor to determine a resistance of the heating element based on the current and the voltage; determine the operating temperature of the heating element based on the resistance and a reference resistance; compare the operating temperature to the temperature setting; and output a signal to reduce power supplied to the heating element when the operating temperature exceeds the temperature setting. According to another embodiment the temperature setting is at least one a temperature safety limit, a user-configurable temperature preference, or a pre-heat temperature.

In another embodiment, a method for controlling temperature of a heating element in an electronic vaporizer is provided. The method includes determining an operating temperature of the heating element based at least in part on a measured resistance of the heating element and calibration information established with respect to the heating element; comparing the operating temperature to a temperature setting; and regulating a power supplied to the heating element from a power source to maintain the operating temperature at or below the temperature setting. In a further example, the calibration information includes at least a reference resistance indicating a resistance of the heating element at a predetermined temperature and a temperature coefficient of resistance curve for the heating element. In another example, the temperature setting is a preheat temperature such that the method further includes detecting user inhalation based on an amount of power required to maintain the operating temperature at the preheat temperature; and regulating the power supplied to the heating element from the power source to prevent the operating temperature from exceeding a second temperature setting during user inhalation; and reducing the power supplied to the heating element after user inhalation to return the operating temperature to the preheat temperature. In still a further example, regulating the power supplied to the heating element includes supplying additional power until the operating temperature reaches the temperature setting.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As utilized herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

This written description uses examples to disclose the invention, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. An electronic vaporizer used to simulate smoking, comprising:

a heating element for heating a fluid to produce a vapor;

a power source to provide electrical power to the heating element for heating the fluid; and a control circuitry operatively connected to the power source to regulate a supply of electrical power to the heating element, the control circuitry being in communication with: (i) a current sense that measures a current output to the heating element, or (ii) a voltage sense that measures a voltage output to the heating element, wherein the control circuitry regulates the supply of electrical power from the power source to the heating element based at least in part on an operating temperature of the heating element and a temperature setting to prevent the operating temperature of the heating element from exceeding the temperature setting, wherein the control circuitry determines the operating temperature of the heating element based on a measured resistance and a reference resistance based on known temperature coefficient of resistance characteristics associated with the heating element and one or more measurements by the current sense or the voltage sense, wherein the reference resistance indicates a resistance of the heating element at a predetermined temperature; and a machine-readable indicia associated with the heating element configured to convey reference information to the control circuitry, wherein the reference information specifies at least two of: a resistance of the heating element at the predetermine temperature, a boiling point of the fluid, a temperature coefficient of resistance curve for the heating element, or the temperature setting suitable to vaporize a portion of the fluid to be inhaled by a user for simulating a smoking experience.

* * * * *